United States Patent [19]

Griffiths

[11] Patent Number: 4,567,008
[45] Date of Patent: Jan. 28, 1986

[54] PRODUCTION OF FOAMS
[75] Inventor: Anthony C. M. Griffiths, Brickhill, England
[73] Assignee: Hyman International Limited, Oldham, England
[21] Appl. No.: 526,494
[22] Filed: Aug. 25, 1983

Related U.S. Application Data

[63] Continuation-in-part of Ser. No. 438,879, Oct. 5, 1982, Pat. No. 4,504,429.

[30] Foreign Application Priority Data

Feb. 18, 1981 [GB] United Kingdom ................. 8105078
Jan. 2, 1983 [GB] United Kingdom ................. 8301733

[51] Int. Cl.⁴ ..................... B29C 67/22; B29C 39/44; B29C 39/06
[52] U.S. Cl. ................................ 264/40.5; 264/46.2; 264/51; 264/DIG. 84; 425/89; 425/149; 425/224; 425/817 C
[58] Field of Search .............. 264/DIG. 84, 321, 46.6, 264/51, 45.8, 46.2, 40.5, ; 425/89, 224, 817 C, 149

[56] References Cited

U.S. PATENT DOCUMENTS

| | | | |
|---|---|---|---|
| 3,584,108 | 7/1971 | Nelson et al. | 264/321 X |
| 3,971,112 | 7/1976 | Amato et al. | 264/46.6 X |
| 4,026,979 | 5/1977 | Palomares | 264/45.5 |
| 4,069,285 | 1/1978 | Morgan | 264/51 |

FOREIGN PATENT DOCUMENTS

| | | | |
|---|---|---|---|
| 741836 | 5/1970 | Belgium | 264/DIG. 84 |
| 1169648 | 5/1964 | Fed. Rep. of Germany | 264/DIG. 84 |
| 1504091 | 7/1969 | Fed. Rep. of Germany | 264/DIG. 84 |
| 2517591 | 6/1983 | France | |
| 999715 | 7/1965 | United Kingdom | 264/DIG. 84 |

Primary Examiner—Philip Anderson
Attorney, Agent, or Firm—William R. Hinds

[57] ABSTRACT

A method of continuous production of foamed material, wherein foam forming materials are fed from below at a controlled rate and the foamed material is drawn away from above at a corresponding rate. Foaming takes place in a diverging expansion enclosure bounded by moving sheet material in the form of webs or in tubular form constrained to follow a diverging path and drawn away from above so as to travel with the foaming material at a rate corresponding to its rate of travel. The enclosure is defined above by foam already expanded, at the sides by the sheet material, and below by a feed zone sealed to contain the foam forming materials. The enclosure leads into an upwardly directed take off path for the foam. Appropriate machines for practicing the method utilize either webs of sheet material or sheet material in tubular form, which tubular form may itself be made by the machine from webs.

34 Claims, 27 Drawing Figures

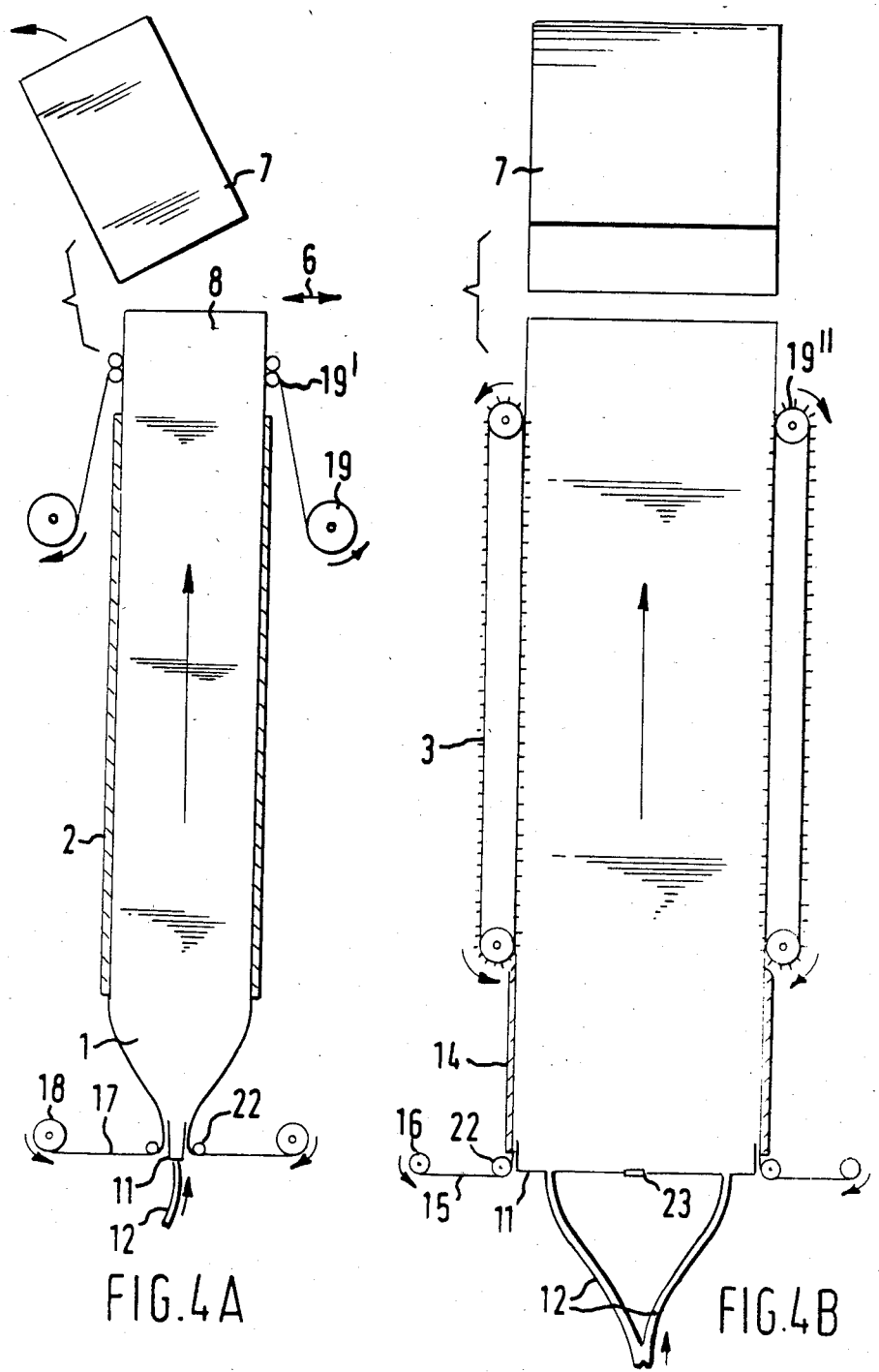

A = 23 KG/M³
B = 8%

A = 21 KG/M³
B = 10%

A = 33 KG/M³
B = 13%

A = 25 KG/M³
B = 6%

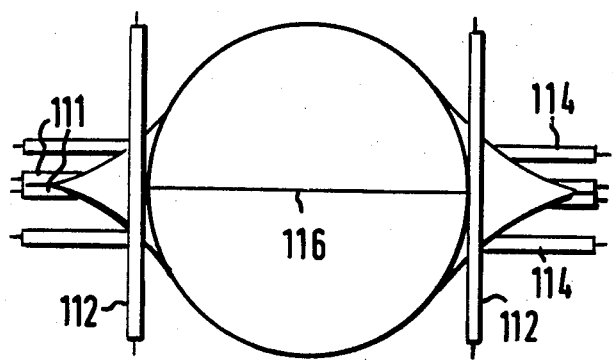
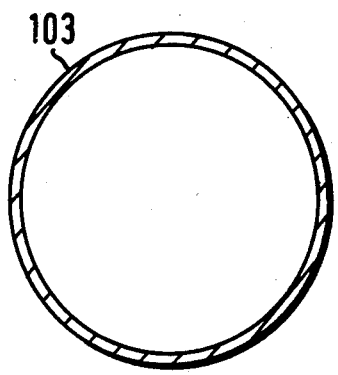
FIG.11　　　　　　　FIG.12
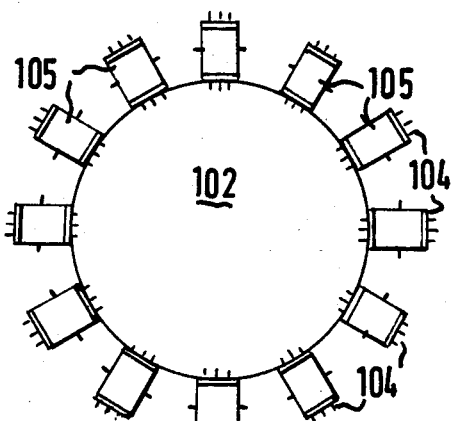
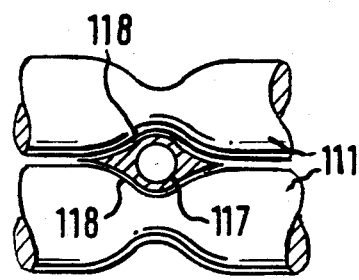
FIG.13　　　　　　　FIG.15
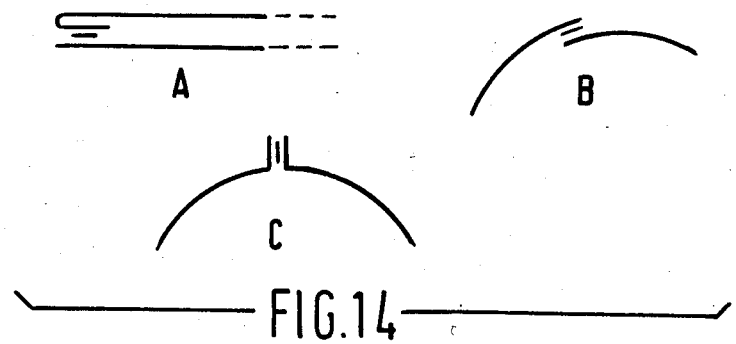
FIG.14

PRODUCTION OF FOAMS

FIELD OF INVENTION

The invention relates to the production of foamed materials and in particular of polyurethane and other polymer foams, in terms of which it is largely described, and is a continuation-in-part of application Ser. No. 438,879, filed Oct. 5, 1982, PCT filing date Feb. 15, 1982, now U.S. Pat. No. 4,504,429, issued Mar. 12, 1985.

PRIOR ART METHODS

Expanded materials, particularly polyurethane foams, are made in both batch and continuous plant.

Batch production may be at any desired rate to suit subsequent conversion but is inherently labor intensive, can give variation from block to block, and is wasteful in giving blocks where all six sides are skinned and need trimming. The blocks, foamed in molds, also show undesirable densification at the corners, which the rising and steadily more viscous material has to be forced to occupy by a weighted, floating cover or other means.

Continuous production as currently practiced also has major disadvantages. The conventional, horizontal machines have inherent characteristics of large size and high minimum production rate, arising from the nature of the foaming reaction and the newly formed foam, and the curing time needed before material can be handled This curing time, typically 5 to 15 minutes for polyurethane, sets the length of the plant once the rate of travel of the conveyor that carries the foamed material is determined. This rate of travel in turn depends on the height of the block required, only a certain steepness of profile bein supportable by the material in the early stages of foaming and setting. An over-steep profile gives problems of underrun by dense, unfoamed material, or of slumping of unsupported newly foamed material, or both. The conveyor must travel fast enough to maintain the proper profile, giving a minimum production rate of for example 100-200 kg/min for 1 meter high polyurethane blocks, and thus a machine length of 40 to 50 meters. Any attempt to reduce the speed of the conveyor to give a lower production rate and hence in principle a shorter machine steepens the profile and causes underrunning or slumping, or both, making production of a uniform block impossible. Large machines thus have to be installed, at heavy capital cost, only to remain unused for much of their time.

The limiting factors are illustrated in the accompanying sketch drawings of the principle of two known kinds of machine for foaming polyurethane, the first (FIG. 1) having liquid reactants fed direct to a slightly sloped conveyor (about 6° to the horizontal) and the second (FIG. 2) having the reactants fed to a trough, from which they spill over in the first stages of reaction onto a fall plate leading to a horizontal conveyor. Such machines are described in some detail in for example U.S. Pat. Nos. 3,325,823 to D. J. Boon and 3,786,122 to L. Berg.

The foam profile in the machine of FIG. 1 is approximately as shown at 'B', determined by the rate of feed of reactants at 'A' and the rate of travel of the conveyor. The boundary between closed-cell foaming material and opencell material after gelling and breathing is shown at 'C', the breathing zone being marked 'D'. Cut-off is at 'E'. The rate of travel has a certain minimum, since while to avoid slumping, on running more slowly, a more steeply inclined conveyor would in theory steepen the profile with respect to the conveyor but leave the effect of gravity unaltered, the liquid reactants fed at 'A' would then underrun the foaming mass.

In the machine of FIG. 2 the risk of underrun problems has been reduced by conducting the first stages of reaction in the trough and feeding the resulting creamy and already somewhat viscous reacting mass to the fall plate 'F'. There is still however a profile 'C' between closed-cell fluid froth and open-cell newly gelled material, which cannot be steepened by reducing the conveyor speed and hence production rate without danger of slumping and thus loss of uniformity in the resulting block.

The difficulties with these machines are felt only when full size foam blocks at production rates below 100–200 kg/min. are required, but it is in fact only the very largest producers that can use capacity of that order. Many machines are as noted run only for an hour or two a day, the user spending the rest of the day handling the resulting foam. A typical small foamer producing say 2000 tons or less of finished foam annually might want production at 10% of the above rate for economic operation, and cannot accept the storage and handling problems of large quantities of foam and the cost and space requirements of a large machine. Even middle range producers who can accept the big machines, with their disadvantages, would be better served by machines of lower production rate.

There is therefore a potential demand, hitherto unsatisfied, for a continuous-production machine capable of running at for example 10 to 50 kg/min. producing polyurethane foam, that is to say levels convenient to a typical small foamer's production.

The Principle of the Invention

I have now found that if the principle of existing machines is abandoned a low production rate machine can be provided. The invention stems from a realization that horizontal production is unnecessary and that in a suitably designed machine foam can be drawn away upwardly rather than horizontally, without interference with the foaming reaction.

Specific Prior Proposals

Proposals have in fact been made for the continuous upward production of foam, in West German Patent Specifications Nos. 1,169,648 (Munneke) and 1,504,091 (Continental Gummi-Werke), in East German Patent Specification No. 61613 (Berbig), and in Tomasoni Italian Specification No. 851,709 (corresponding to German Printed Application No. 1,956,419 and Belgian Specification No. 741,836), but I know of no practical application of these proposals. It appears that problems of control of the reaction and production of a uniform product had not been solved by the proposals as described, so that for all their disadvantages the large horizontal machines have been in extensive commercial use. Berbig is a generalized disclosure giving no process details or other indication that it was even run, and Munneke is the same. Moreover he shows a flat-bottomed reaction chamber of a type impossible in our experience to feed uniformly with the foam forming material. Even the most detailed of the three disclosures, that by Continental Gummi-Werke, does not recognize any difficulty in relating the machine construction to the stages of the foaming reaction to secure uniformity in the finished foam. Tomasoni is another such example.

Features and Aspects of the Invention

I have found that for successful continuous upwards foam production, it is necessary that foaming takes place in a diverging expansion enclosure the walls of which have surfaces travelling with the foaming material, which enclosure is defined above by foam already expanded, at the sides by said walls and below by a feed zone for the foam forming materials, and leads into an upwardly directed take off path for the foam. Curing can occur, or at least begin, in the take off path. More particularly, I have achieved successful continuous production of foamed material, wherein foam forming materials are fed from below at a controlled rate and the foamed material formed is drawn away from above at a corresponding rate, wherein foaming takes place in a diverging expansion enclosure bounded by moving sheet material constrained to follow a diverging path and drawn away from above so as to travel with the foaming material at a rate corresponding to its rate of travel, and wherein the enclosure is defined above by foam already expanded, at the sides by said sheet material, and below by a feed zone sealed to contain the foam forming materials, the enclosure leading into an upwardly directed take off path for the foam.

The provision of the travelling surfaces in the expansion enclosure may be by webs travelling over fixed surfaces. Alternatively, the expansion enclosure is formed by a flexible web in tubular form which is fed flat with foam forming materials passing to the interior of the tube and then drawn away at a rate matched to the rate of feed, guided externally to assume a circular or other cross-section as the foam forming materials expand within it.

Foaming

The greater part, though not necessarily the whole, of the foaming takes place in the expansion enclosure. Specifically, it will be appreciated that as the feed zone and expansion enclosure are continuous with each other, and the division between the two (in machines not using the tubular web) is regarded as where the travelling surfaces begin, foaming can start in the feed zone.

Then, in such machines, the foaming material contacts the travelling surfaces at an intermediate stage of reaction. The latest satisfactory intermediate stage will vary with the kind of foam, but in all ordinary cases the stratum of the foaming material in which contact with the travelling surface is made will be less than 50% expanded in terms of the volume change from initial foam forming materials to finished foam. More usually the material will be less than 40% and often less than 30% or even 20% expanded.

The position in the machine of the stratum of a given degree of expansion is calculated from the free foam rise profile in a box test on a batch of the material, taken with the feed rate of fresh material to the machine, by summing the volumes reached by notional successive small volumes of material during their individual residence times and relating the sum to the combined volume of the feed zone and expansion enclosure of the machine up to a given height Examples of these calculations are given in detail later herein.

The degree of expansion of the material, determining increasing viscosity and eventual gelling of materials such as polyurethane, is thus related to the latest suitable position for take up on the travelling surfaces. The increasing slowing of material that occurs adjacent to stationary walls as viscosity increases is countered, and holding back of material at the walls leading to gelling thereon does not occur. On the contrary, a smooth flow is maintained and blocking of the flow or intermittent loss of lumps of gelled material giving non-uniform properties in the product avoided.

Expansion Enclosure

The expansion enclosure in all machines diverges (in the sense of having increasing cross sectional area) over the greater part though not necessarily the whole of its volume. Thus it may both begin and end, and conveniently does at least end, with a non-diverging section. The former may arise if the travelling surfaces are brought in early, lower than the level at which expansion of the foam mix commences. The latter is convenient to allow for control tolerances during a run, so that completion of expansion does not have to be matched exactly to the cross-section and there is no danger of expansion being insufficient and leaving a gap of varying width between the expanded mass and the enclosure walls.

Travelling Surfaces

The speed of the travelling surfaces need not be the same as the translational speed of the foaming mix adjacent to them, though desirably the two speeds approximate. It will be appreciated that where for example a rectangular section expansion enclosure has two opposite parallel walls and the divergence of cross section is provided by the other two walls, webs of paper or plastics drawn over the diverging walls to provide the travelling surfaces cannot match the speed of the enclosed material both in the diverging and in subsequent parallel portions of the path of the material.

Thus in the above way the whole body of material is kept moving during expansion reducing eddy or river bank effects, preventing development of gelled or solidified material on the enclosure walls, and ensuring that material at any given stage of expansion is essentially in the same horizontal plane throughout and that a uniform body of foam is produced. In polyurethane foam production for example, the boundary between still-liquid and gelled material is horizontal or essentially so, uninfluenced by gravity. Underruns or slumping as discussed earlier cannot arise, and any convenient production rate can be adopted with a maximum depending on the length of the material path and thus the dwell time it gives. There is in the foam produced an inherent uniformity of properties, the 'gravity history' of all parts of the block being the same.

Use Of Tubular Webs

The tubular web is conveniently of plastics and may be in any convenient form. For example lay flat tubing may be slit for entry of a feed for the foam forming materials and re-sealed, or used as a shirred (concertina'd) pack. I prefer however for convenience of layout to feed two apposed flat webs and seal them together at the edges as by heat, applied adhesive, or double-side adhesive tape.

The feeding of the tubular web to form the expansion enclosure is suitably through pinch rollers or apposed conveyors to allow the feed rate of the web to be matched easily to the rate at which expanded foam is drawn away. There is then no tension in the web as it is guided to assume the final section from the initial apposed state, and constant reaction conditions can be maintained in an expansion chamber of a known, predetermined shape. Further, the pinch rollers, particularly if they have a resilient surface, can readily be grooved to allow passage of one or more feeds for the foam forming materials, for example pipes of lenticular external cross-section, without leakage of the foam forming materials. These, at least in the case of polyurethane foam, are thin searching liquids difficult to confine.

The guides are conveniently apposed pairs of plain or shaped rollers, but many forms of fixed or moving guide may be used according to the final shape required and the position at which a guide is used. In particular, guides assisting the web to bell out at the sides from the apposed state as fed, to form the expansion enclosure, are preferably powered rollers or belts passing the web onward with a friction drive of the material of the web. The belling out is thus controlled and constrained to give a regular divergence of the enclosure. At the ends in contrast simple stationary guides or idle rollers are sufficient. These guides lie across the line in which the web is fed and are simply constraining the web to take an inward path. Interchangeable sets of guides for different final block shapes can be provided, a particular advantage of the invention.

In another aspect of the invention, applicable to the present or prior machines whether operating vertically or horizontally, heated surfaces are applied at the surfaces of a foam block once fully expanded, to prevent loss of heat from the block and thus secure a uniform curing rate through the block. In foam blocks as currently made, the interior is fully cured a short time after the stage of full expansion has been reached, while the exterior, cooled by the surroundings, takes much longer, making for unnecessarily large machines and poor block surfaces. In polyurethane blocks for example, an interior temperature of 100°–120° C. is readily reached and maintained by the heat of reaction and cure proceeds quickly. Temperatures are however much lower at the block surfaces.

The preferred heating is applied over the whole of the surface of the block. Further it is preferably applied by low-output heaters backed by heat insulation, given that the purpose is to ensure that the block does not lose heat to its surroundings rather than actually to pass heat to it. Metal film heating as used in car window demisters is for example suitable, or heating from a carbon loaded polymer film. Low, safe voltages can be used, and at the low outputs of for example 50 watts/sq. meter that are suitable no temperatures to cause injury by contact can develop in any part of the heating surface not protected by the insulation.

Heating can also be applied to surfaces in contact with the foam before it has fully expanded but that is not preferred, being unnecessary and risking splits in the finished foam through premature surface cure.

Features and Aspects of the Invention—Plant

The invention further provides machines for continuous production of foamed material, wherein foam forming materials are fed from below at a controlled rate by feed means, and the foamed material formed is drawn away from above at a corresponding rate by take off means, wherein foaming takes place in a diverging expansion enclosure bounded by moving sheet material constrained to follow a diverging path and drawn away from above so as to travel with the foaming material at a rate corresponding to its rate of travel, and wherein the enclosure is defined above by foam already expanded, at the sides by said sheet material, and below by a feed zone sealed to contain the foam forming materials, the enclosure leading into an upwardly directed take off path for the foam.

Definitions

The invention is in principle applicable to the production of foamed materials of all kinds, but more specifically to expanded and in particular chemically expanded polymer foams. 'Cure' is any chemical or physical process by which newly formed foam becomes handleable, and 'reaction' any process by which gases expanding the foaming material are developed.

Feed Zone and Expansion Enclosure Construction

If achievable without serious sealing problems (in machines not using the tubular web) the whole expansion may as noted take place in contact with travelling surfaces, when the feed zone will be small, but for materials such as polyurethane foams, where the initial reactant mix is a thin searching liquid difficult to seal, it is preferable for the feed zone to be defined by an open topped vessel fed continuously from below with the foam forming materials, the travelling surfaces being introduced where this vessel adjoins the walls of the expansion enclosure. Such a vessel can readily be dimensioned to allow for first stage of for example a polyurethane foaming reaction to take place in it, a creamy and already somewhat viscous material passing to the expansion enclosure proper.

The shape of the expansion enclosure and feed zone is a matter of convenience but is generally such that the increase in volume in the direction of travel of the foaming material is matched to the expansion curve of the reacting material. There is then a substantially constant speed of upward travel in the mass of foaming material.

Conveniently the feed zone in such machines is in the form of a horizontal channel defined by walls continued at the sides by diverging walls and at the ends by parallel walls of the expansion enclosure between which the side walls lie. Such a construction, giving a generally wedge shaped expansion enclosure, lends itself to a variable expansion enclosure geometry, for example by pivoting or flexing the diverging walls, and hence to ready variation in block size while the plant is running by correspondingly moving out the walls of the take off path. It is further possible to have the diverging walls and feed channel telescopic, to allow the depth as well as the width of the block produced to be varied.

Paper and Plastics Webs

The above construction also lends itself readily to the drawing of travelling webs of material such as paper or plastics over supporting wall surfaces, the preferred method of providing the travelling surfaces in machines not using the tubular webs. A paper web for example, folded round at the sides so as to give a lap applied to the back of such walls, readily follows their shape when drawn through from above, even if the shape is somewhat curved, without lifting off and without creeping over the wall edge. Stability is enhanced if the edges of the diverging walls have a longitudinal rib or bead over which the paper passes, and especially if a non-extensible tape is applied down the back of the paper near the edge of the wall (next to the bead if used).

Pressure Monitoring

An important factor in foam production for safety and consistent cell structure, certainly with polyurethane, is control of the pressure within the foaming mass. Since an inherent feature of the upwards foaming concept is that the expansion stage must be conducted in an enclosed volume, and since chemical reactions are prone to variation in rate due to such factors as temperature, degree of mixing of reactants, and impurities, provision for control of and pressure in the expansion enclosure is desirable. It is readily provided by, for example, a pressure transducer in the feed zone wall or any other position where the foaming mix is still liquid, and control of feed or take off accordingly.

In general however it is sufficient to observe the pressure as remaining within safe limits and at a small positive figure. The gelled foam in reaction such as the production of polyurethane cannot then be pulled away from the ungelled still liquid foaming materials below. A suitable pressure is for example 10 to 30 mm/Hg gauge.

Control by Feed and Take Off Rates

Actual control is then by matching the take off rate of the volume of foam of a given density with the feed rate of volume of reactants of a given density (allowing for any reaction loss of materials that do not appear in the finished foam). As noted earlier it is important that the expansion should not have been completed before the foamed material leaves the diverging part of its path. If it shows a tendency to do so, either the total throughput can be increased, or the reaction rate at a given throughput can be slowed, for example by lowering the temperature or the catalyst concentration. Clearly for a fast reacting foam a smaller expansion chamber is needed at a given speed of removal of finished foam than for a slow-reacting one, as less time is occupied between introduction of the materials and their full foaming and thus less volume of finished foam will have been taken off in that time. If a given expansion enclosure is proving too large therefore, slowing the reaction will compensate. In practice a given expansion enclosure volume can be selected, a throughput chosen, considering in its simplest terms weight of reactants in and weight by volume of foam out, and fine control exercised by catalyst or temperature variation, the position of the fullfoaming profile moving up or down according to the reaction rate.

Inclined Paths

The upwards expansion and movement of foamed material is conveniently vertical, but a path inclined from the vertical will serve provided that during expansion material at earlier stages of expansion and thus of higher density remains below material at later stages of expansion and thus of lower density. It may be advantageous to have an inclined path if, as discussed below, conveyors with pins are in use. The weight of the material will assist engagement with the pins on one conveyor as well as the weight being partly taken direct on that conveyor, while still allowing engagement of the pins on the other conveyor with the opposite face of the block. The path of expansion and movement of the foamed material will further normally be straight, but with a flexible foam a change of direction may be made if required once the foam has developed sufficient coherence. A large arc will be required, but will give the possibility for example of long lengths of foam for joining end to end and use in the manufacture of sheets by 'belt' peeling.

Take Off Path

The path of the foamed material may not need to be enclosed (unless to retain heat) once foaming is complete (in the case of polyurethane or other open-celled foam once 'breathing' has taken place) and the material has cured sufficiently to be self supporting.

Preferably however, to reduce frictional effects, the path of the foamed materials is defined after as well as during foaming by moving surfaces. These surfaces may act throughout as conveyors, and indeed, once the foam has developed sufficient strength to sustain tensile forces, will certainly do so where there is adhesion between the foam and the surface. Adhesion of the foam may be sufficient alone where a conveying action is required, but, according to the strength of adherence of the foam to the surfaces and the nature of the materials, positive engagement as by pins or other means may be provided on one or more of the surfaces.

Pins of convenient length for polyurethane foam for example are about 1 cm, spaced laterally 5 cm apart and vertically 5 cm apart, though there is no restriction to any particular spacing or length or distribution of pins. Pins of such length (1 cm) enter only the thickness of the block that is normally skimmed off to clean up the faces, but in any case damage by the pins to the block is generally negligible.

As noted above, a conveyor may rely on adhesion of the formed body of foam, or if required may positively engage it, for example by the pins referred to, which take hold of the foam once it has developed sufficient strength. The conveyor surface, a travelling web of release paper or plastics film as well known per se in horizontal machines, may then be penetrated by the pins as it is fed.

Variation of Block Size

It will be appreciated that the block size is not limited by the foam rise as in horizontal machines. Any block within the limits of size defined by the expansion enclosure and take off path may be produced. This size may in itself be variable if provision is made for varying the separation of opposed parts of the expansion enclosure or otherwise varying the path cross section.

For example as already mentioned (in machines not using the tubular web) the bottom edge of the side walls of the expansion enclosure may be pivoted and the corresponding walls of the take off path moved in and out to match, and/or telescopic side walls (and feed channel or the like) may be used and the end walls moved in and out. This is a valuable feature for machines of moderate output such as the invention gives, allowing small runs of various sizes of block.

A preferred shape in such machines for the expansion enclosure is as discussed earlier a wedge opening into a rectangular (or square) path for the formed foam. A feed zone, in the form of a channel to which foam forming materials are fed can then conveniently be placed at the base of the wedge and the main faces or sides of the expansion enclosure can readily be made adjustable as referred to above to give a variable included angle and hence block size. The length of and dwell time in the expansion chamber can, further, suit the particular material being foamed and the production rate in use.

Alternative Expansion Enclosure Constructions

The walls of the expansion enclosure in machines not using the tubular web are conveniently flat or shaped metal or like plates, but flexible members can also be used, particularly for diverging walls. The length can then for example be adjustable by altering the separation of end rollers or other guides over which the flexible members pass. Conveniently a continuous belt is used, one or more jockey rollers or like guides taking up excess. Ordinarily the belts will be moving, conveniently fed with a release paper or plastics film web as with the fixed walls referred to earlier.

The travelling surfaces at the diverging sides of a wedge-shaped expansion enclosure with either fixed or flexible walls can if so wished move at a greater speed than a conveyor carrying the formed foam away, according to their inclination to the main direction of flow, when all 'river bank' effects in the movement of the material are avoided. Separate travelling webs can readily be provided to achieve this.

Sealing Expansion Enclosure

To seal corners against leakage of materials where the sides of the expansion enclosure meet, close contact should be maintained, and this is readily possible where for example wrap-round webs of paper or the like are used as described. Alternatively it may be expedient to feed a release paper or plastics film in such a way that it laps inside the corners onto the face of an engaging member of the expansion enclosure, so that the pressure of foam forming materials or newly formed foam engages the lap and enhances the seal. Where feed zone and expansion enclosure meet, a flap of flexible plastics lapping onto the incoming webs providing the travelling surfaces gives a good seal.

Alternative Block Shapes

The body of foam produced as described above in machines not using the tubular webs is conveniently rectangular or square but there is no limitation to that shape. In particular, round blocks can be made with a suitably shaped feed zone, expansion enclosure and take off path, for direct use in the production of foam sheet by the 'peeling' process. Any prismatic or indeed rounded form may be produced by an appropriately shaped and if required sectional expansion enclosure and take off path, fed with as many separate webs of release paper or plastics film as may be convenient. For circular section blocks, a convenient expansion enclosure is conical, formed e.g. of two or more sections fed with release paper or plastics film webs guided to enter where the feed zone meets the expansion enclosure. Where they enter, such webs are largely external of the expansion enclosure, folded back through gaps between the sections, but as they pass up the enclosure the excess is largely drawn in. Feed problems are not serious at the low rates of travel required.

THE DRAWINGS

The following detailed description is by way of example of the invention.

FIGS. 1 and 2 of the accompanying drawings are of known machines as referred to earlier, but the following description refers to the further accompanying schematic drawings, wherein:

FIG. 3 shows a general view of a complete machine;
FIGS. 3A shows paper folder details;
FIGS. 4A and 4B show the machine in two vertical sections at right angles to each other;
FIG. 5 shows an expansion enclosure;
FIGS. 6A–6E show density profiles for foam blocks made in three conventional inclined-conveyor machines as referred to in relation to FIG. 1, using top papers to control top skin formation and improve block shape (FIGS. 6A, 6B, 6C); a conventional machine with trough and fall plate and a free top surface as referred to in relation to FIG. 2 (FIG. 6D); and the machine of the invention (FIG. 3) operated as described in Example 1 herein;
FIG. 7 is a plot of the combined volume of the feed zone and expansion enclosure (up to the parallel section) of the last referred to machine;
FIG. 8 is a rise profile from a box pour of the materials used in Example 1;
FIGS. 9 and 10 are part sectional schematic elevations of a machine in accordance with the invention using a tubular web;
FIG. 11 is a plan of the machine taken along A—A in FIG. 9;
FIG. 12 is a section of the machine along B—B in FIG. 9;
FIG. 13 is a section along C—C in FIG. 9;
FIG. 14 indicates the joining of apposed webs;
FIG. 15 is a detail of a feed pipe on an enlarged scale compared with the other figures, for use in a tubular web machine;
FIGS. 16–18 are schematic illustrations of part of a rectangular block machine corresponding respectively to FIG. 11 and the bottom parts of FIGS. 9 and 10;
FIG. 19 is a detail of the corner formation of the tubular web in the rectangular block machine of FIGS. 16 to 18;
FIG. 20a is a schematic illustration of the use of a shirred pack of plastic tubing as the tubular web; and
FIG. 20b is a schematic illustration of the use of lay flat tubing as the tubular web.

The machine shown may be used for example for flexible polyurethane, rigid polyurethane, polyisocyanurate, ureaformaldehyde, phenol-formaldehyde, silicone and epoxy based foams but are described in relation to the first of these.

Detailed Description of Machine of FIGS. 3 to 5

Figure 1:
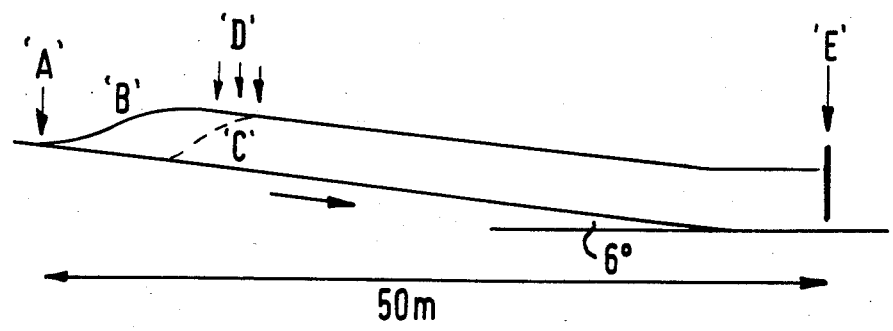
Figure 2:
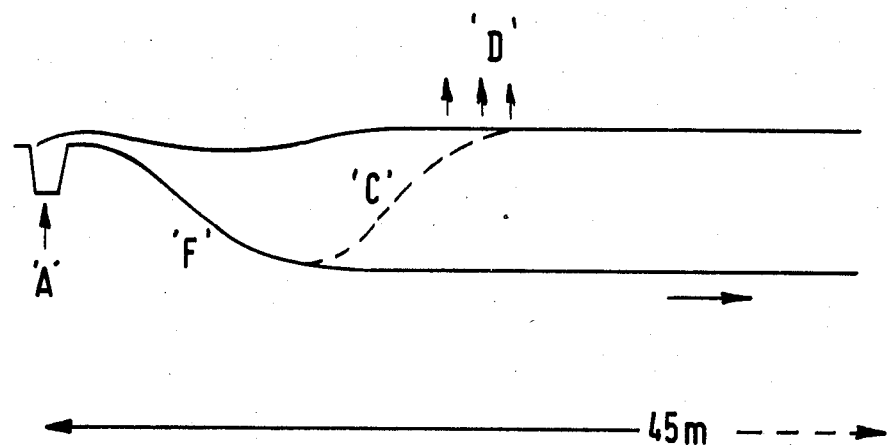
Figure 3:
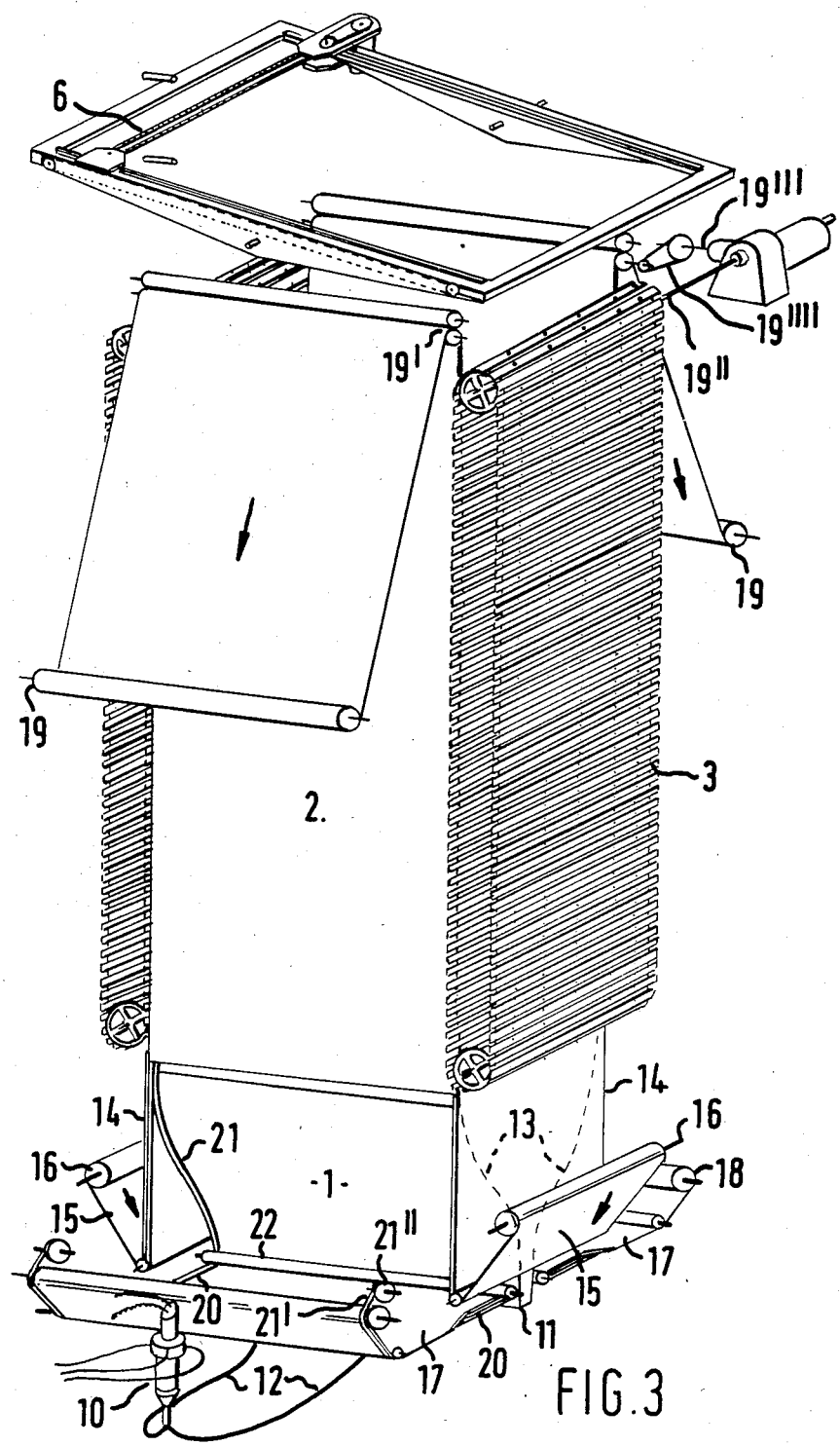
Figure 5:
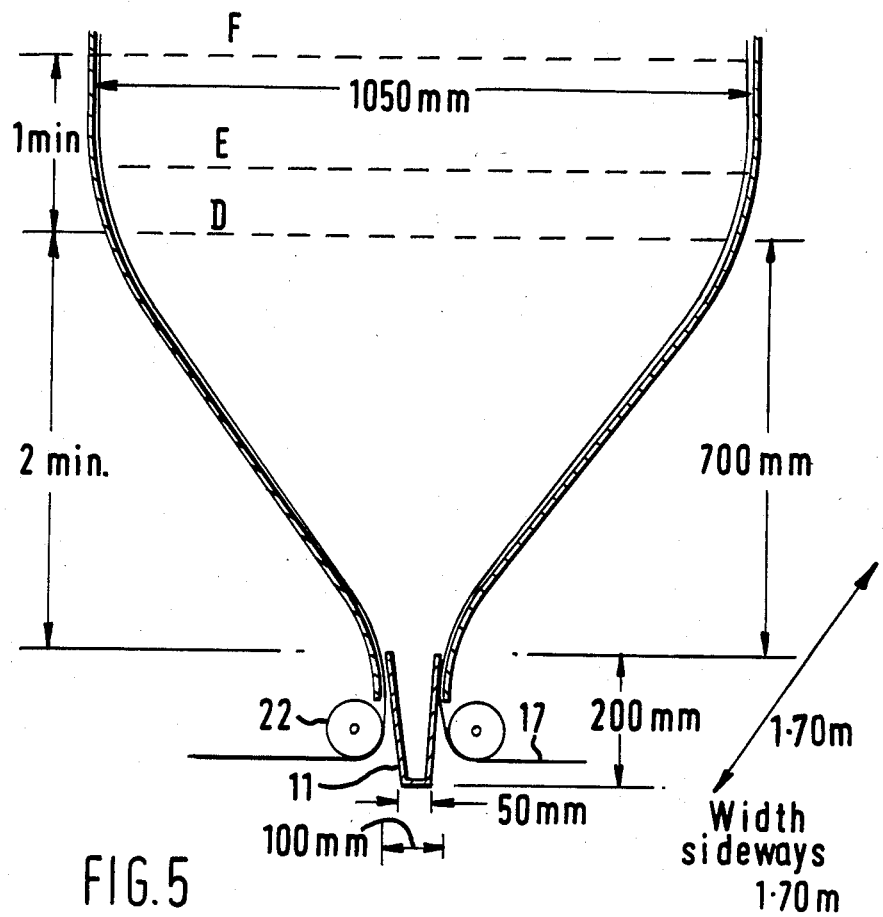

In the machine as shown in FIGS. 3 to 5 an expansion enclosure 1 lies below a take off path defined by opposite fixed walls 2 and spiked slat conveyors 3. The machine is built on a frame (not indicated) with an access stair to a central platform and a top platform. A generally conventional inclined-path cut-off saw (giving a square cut) is provided at 6, to sever blocks 7 (FIG. 4) from the rising foam body 8, which blocks are tipped onto a conventional roller conveyor at the top right of the machine as seen in FIG. 3.

At one side of the machine is a generally conventional mixing head 10 delivering to a feed channel 11 by means of two delivery pipes 12. The feed channel lies between the lower edges of two curved expansion-enclosure side walls, the edges of which are indicated at 13, and two end walls 14. The side walls end at the take off path walls 2, and the end walls 14 at the slat conveyors 3.

In the expansion enclosure and take off path moving surfaces are provided on the end walls by means of polyethylene webs 15 fed from rolls 16 and drawn round the lower edges of the end walls 14 by the conveyors 3. The webs remain on the end faces of the foam blocks produced. The moving surfaces for the curved side walls of the expansion enclosure are provided by paper webs 17 fed from rolls 18 and drawn through the machine by powered pinch rolls 19' (FIG. 4A) to take-up rolls 19, separating them from the side faces of the block. The paper webs pass once through the machine and are scrapped after use. The slat conveyors and pinch rolls are synchronized by a common drive below the top platform, consisting of four shafts in a square formation with pairs of bevel gears at the corners, two of the shafts (one of which 19" is shown) forming the top axes of the conveyors and the other two (of which one, 19''', is also shown) carrying chain drives 19'''' to the lower rolls of the pinch rolls 19'.

Figure 3A:
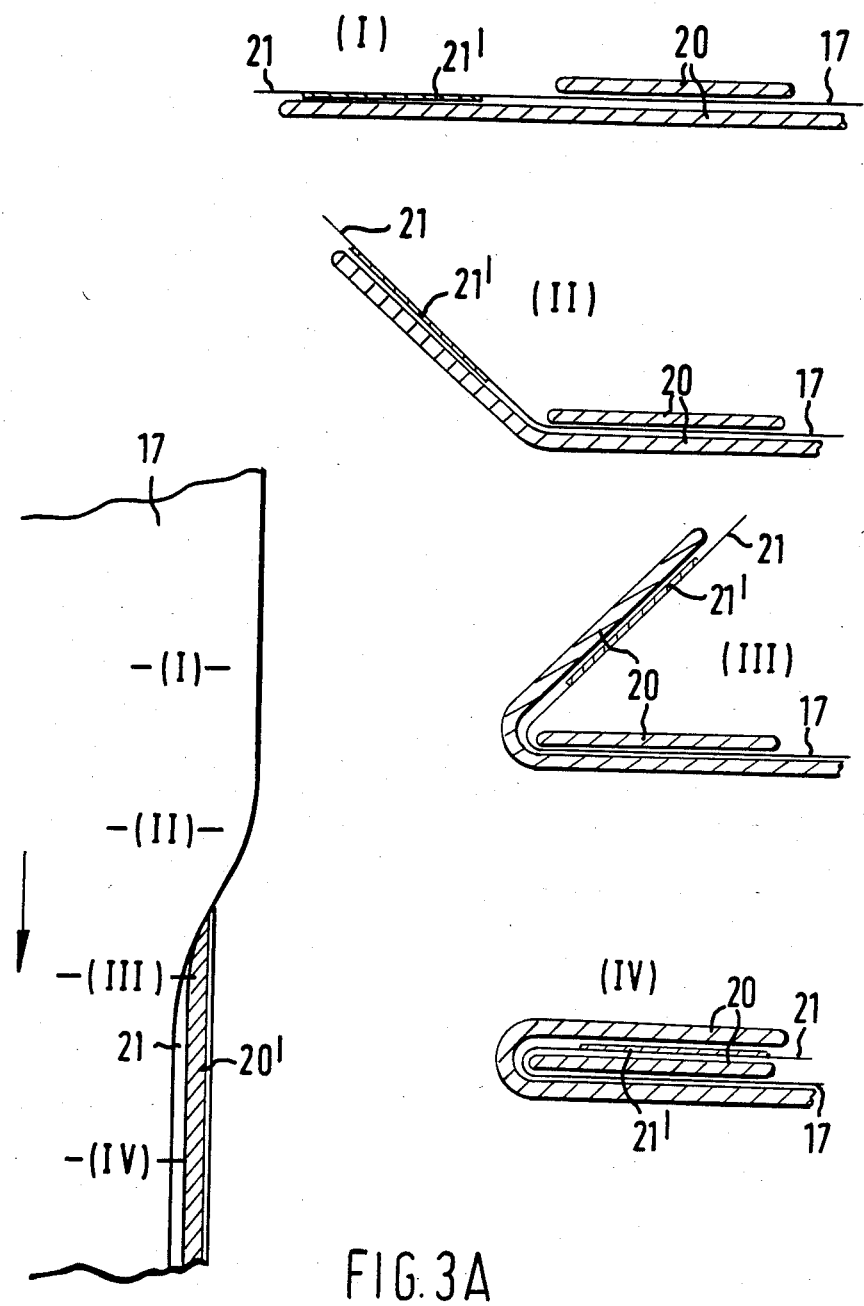

At the bottom of the machine, before it passes under a guide roll 22 and onto the side walls of the expansion enclosure, each paper web 17 is folded at each side by two-part guides 20 of per se known kind to form an edge lap 21 at each edge 13 of the expansion-enclosure side walls, passing over beads of a few mm diameter (not seen), formed on the edges of the walls. FIG. 3A shows the successive stages (i) to (iv) of formation of a lap, from above (at the left of the figure) and in section with the guides 20 shown (at the right of the figure). To further assist in maintaining the position of the paper and hence cause it when within the expansion enclosure to follow the curve of the walls, an inextensible pressure-sensitive adhesive tape 21' is fed onto the under face of the paper before the folding, from reels 21" mounted on the machine frame, so as to lie adjacent to the bead after the folding. The tape passes with the paper under the rolls 22, and strengthens it for its transit through the machine.

In operation of the machine the take off speed of the foam is balanced against the rate of feed of reactants. A slight excess pressure is maintained in the expansion enclosure, for example of a few centimeters of mercury, and a transducer 23 in the base of the feeder channel monitors this pressure continuously.

FIG. 5 shows on a larger scale the curved shape of the expansion enclosure sides, matched to the expansion of the foam. The figure is, further, marked up with figures for height, elapsed time and percent of final expansion reached at a given level for a particular HR (high resilience) polyurethane foaming reaction. The dwell time in the main (diverging) part of the expansion enclosure is in this example approximately two minutes, and the foam reaches approximately 90% of full expansion (the expansion rate is substantially linear up to that point) at the exit from the diverging path provided by the enclosure. This level is marked D on the figure. Above this is shown marked E the point at which 100% expansion is reached, that is to say at which the cells break and the material begins to breathe. The level F (about 1 further minute from D) is that at which the material becomes sufficiently strong to support tractive forces and the conveyor takes over. The 'foaming height' is therefore no more than 1-1½ meters. The breathing takes place upwards through the open-cell material above, and an incidental but very significant advantage of the machine is that an extractor hood can very readily be provided over the top of the foam path to remove the gases breathed from the foam, where for example toluene diisocyanate (TDI) is the isocyanate used, to keep vaporized toluene diisocyanate levels surrounding the machine down to permitted levels without use of large volumes of extraction air. This is an important practical advantage, given the high cost of extraction equipment. Compared with mold processes and with horizontal foaming the exposure of material potentially giving off such materials is very small, almost the whole of the reaction mass being enclosed and part of the TDI given off reacting as it passes up the column. Further of course the actual rate of production of TDI fumes is low compared with that from high output horizontal machines.

Description of Tubular Web Machines of FIGS. 9–20b

Referring first to FIGS. 9–14, in the machine the general vertical disposition of the expansion enclosure and subsequent foam path is seen. The expansion enclosure 101 leads into the take off path 102 defined by a cylindrical, preferably heated wall section 103 and further up by a series of twelve spiked band conveyors 104 surrounding the path and gripping the foam once it is strong enough to take traction. The conveyors run on powered drive wheels 105 and idler wheels 106 in a manner conventional in itself and not described further. Heating in the wall sections 103 may be provided by a conductive, carbon loaded polymer film with electrical supply and electrically insulating backing not shown in detail. Expanded polystyrene slab thermal insulation may surround the heating element formed, and in operation of the machine allows effective cure in the relatively short distance between the expansion enclosure and the commencement of the spiked conveyors. Polyurethane foam for example can then take conveyor pins without risk of them tearing through the body of the material, with loss of traction and damage to the surface of the block.

Below the expansion enclosure 101 are feed rolls 107 and 108 for a high density polyethylene film suitable to withstand temperatures of 100°–120° C., to which it is subjected during formation and cure of the foam, without loss of the strength required. The polyethylene webs are referenced 110 and enter the nip of pinch rollers 111 with two feeds of double-sided adhesive tape fed from reels, one of which is shown at 109. Also present, but not shown, are folding guides which turn over flaps, one at one end of one of the webs and the other at the other end of the other web, so that the tape is fed between the flap of one web and the unfolded face of the other web. When the tubular web formed opens out in formation of the expansion enclosure, this gives a joint in which the tape is between apposed faces and thus under shear forces, rather than forces which would tend to open up the joint by peeling. The point is schematically illustrated in FIG. 14, where FIG. 14a is the join as it enters the nip, FIG. 14b its opened-out form, and FIG. 14c what would be the opened-out form of the less satisfactory join.

Figure 9:
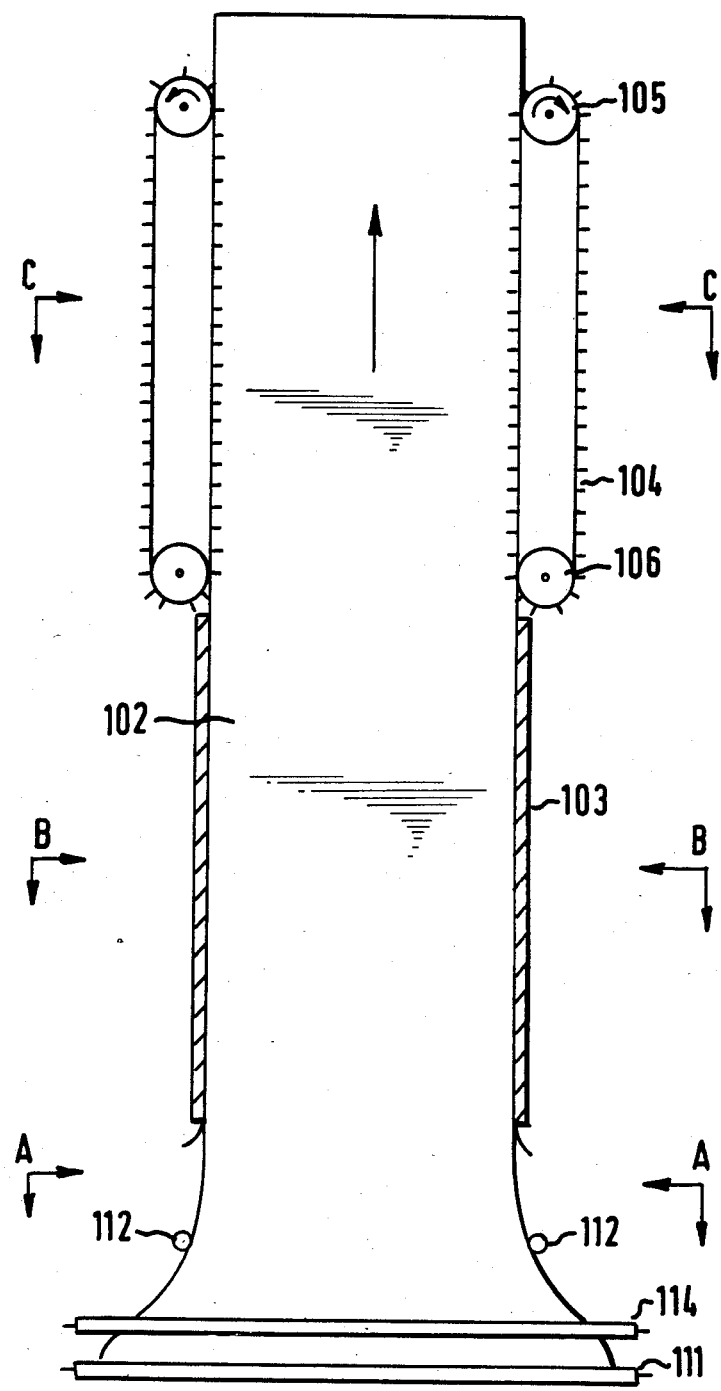

The shaping of the expansion chamber, helping the natural tendency of the web to assume tubular shape as material expands inside it, is achieved by guides in the form of idler rollers 112 (shown in FIG. 9 but omitted from FIG. 10 for clarity) and powered rollers 114, the latter having a rubber surface giving driving, friction engagement with the web. Between the nip rolls 111 and the powered guide rolls 114 are static guides 115, over which the web slides and which prevent any undesired belling out of the web at that position. An alternative would be a pair of belt conveyors of very short travel in relation to their length, replacing the pinch rollers 111 and the guide rollers 114, together with the guides 115, but serving the same function. It may be noted from FIG. 10 how the tubular web opens out in the transverse direction to give a smoothly-contoured expansion enclosure, the rate of feed of the pinch rollers 111 and the powered rollers 114 being matched to that given to the formed foam by the conveyor 104, so that the web is not under tension. It has no tendency to neck in either in the free part at the sides of the expansion enclosure or in the lower part of the take off path within the cylindrical wall, where the foam, although formed, is still very weak. In the longitudinal plane with respect to the pinch rollers, as seen in FIG. 9 (where of course the separate webs fed from the side are omitted for clarity), it can be seen how the web travels in from the exit of the pinch rolls to the guide rolls 112, and thence to the entry to the cylindrical take off path, without difficulty. There is no excess of material, such as is needed to form the belled out expansion chamber shape in the other plane, and hence no difficulty in control of the web. The shaping is well seen in FIG. 11 where the nip is seen at 116, and the translation from the flat form as fed to the cylindrical form, in the web, is well seen. Shown alongside FIG. 11 on a much larger scale is a fragmentary crosssection through the nip, where an externally lenticular shaped feed pipe 117 enters, the rolls being grooved at 118 to allow passage of the pipe. At the low rates of feed required, sealing is satisfactory if the surfaces of the pinch rolls are flexible, for example of a rubber composition, desirable in any event to give positive frictional engagement with the web in order to feed it in a controlled way.

Figure 10:
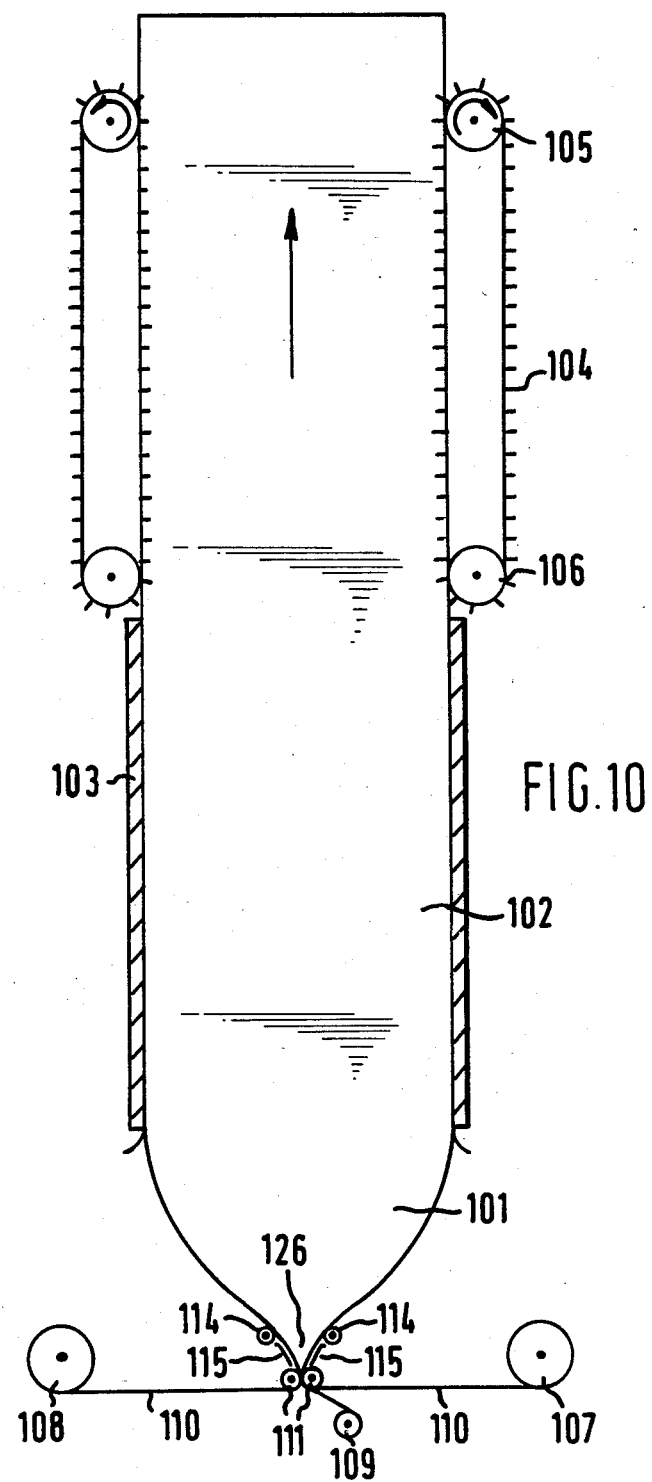
Figure 16:
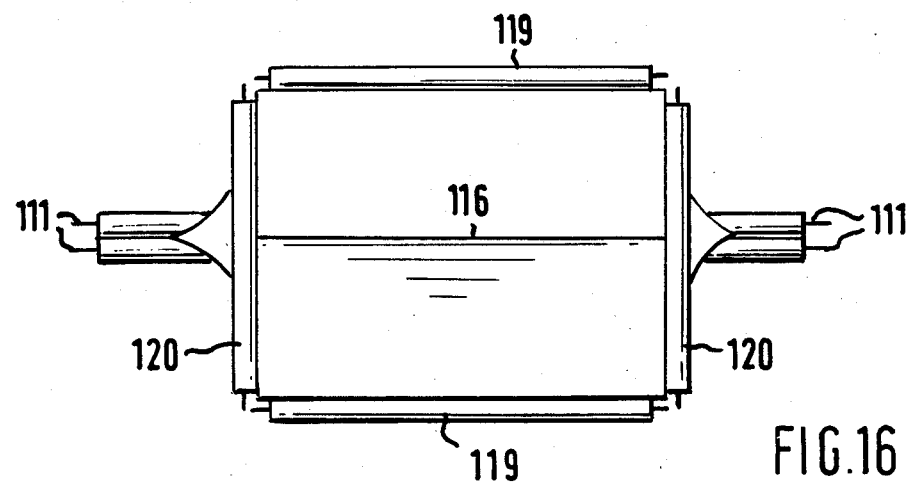
Figure 17:
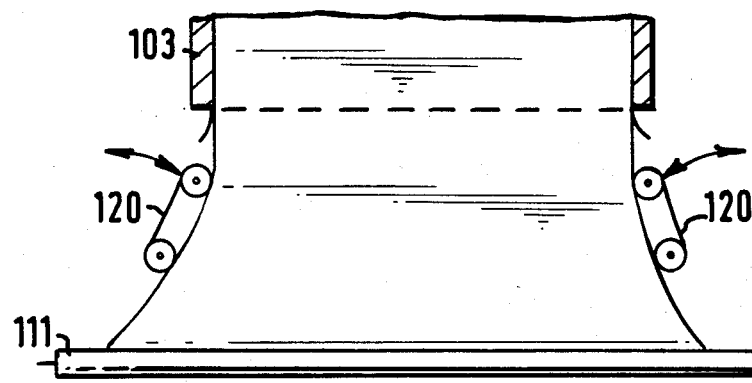
Figure 18:
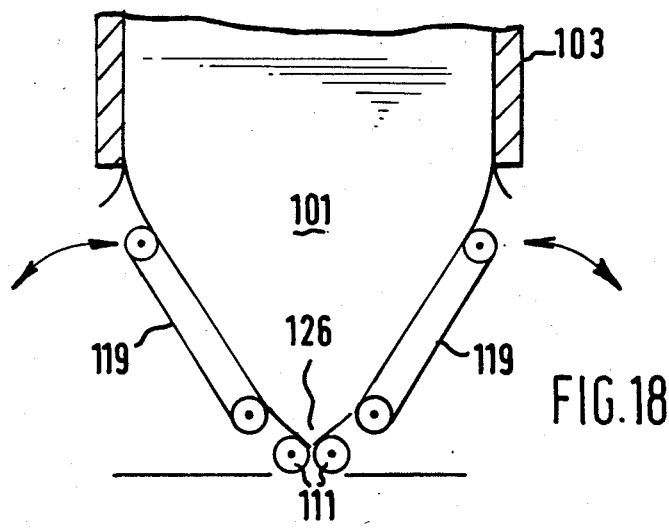

FIG. 16 schematically illustrates a rectangular block machine in a view similar to that of FIG. 11, and FIGS. 17 and 18 schematically illustrate the bottom part of this rectangular block machine in views corresponding to the bottom parts of FIGS. 9 and 10. In this embodiment pinch rolls 111 are used as before, but the shaping guides are pairs of belt conveyors 119 and 120, 119 being preferably driven and 120 being free wheeling or driven, which guide the tubular web into the rectangular shape required. A slight excess of material is present in the web to allow formation of clean corners as shown in slightly exaggerated form in FIG. 19, with a bit of flash that can simply be trimmed off, rather than a rounded corner causing waste in trimming the block to true rectangular section.

Both sets of belt conveyors are mounted to be in the position seen, or alternatively tilted out at the top (as indicated by the arrows) so that their effect on the web is essentially that of FIG. 11. The machine is then capable of producing either a rectangular block, or if required a round block. It will be noted that in formation of rectangular blocks the full-shape guiding is required, while for circular blocks the web tends to the required shape in any case. All shaping is readily achieved, as is of course necessary, while the foam is still fluid enough to be formed without damage to its structure.

Heating at fifty watts per square meter in the section 103, backed up by two inches thickness of rigid polyurethane board insulation, gives a uniform cure in the block. The high density polyethylene web retains its strength satisfactorily at the temperatures reached.

Figures 19, 20A:
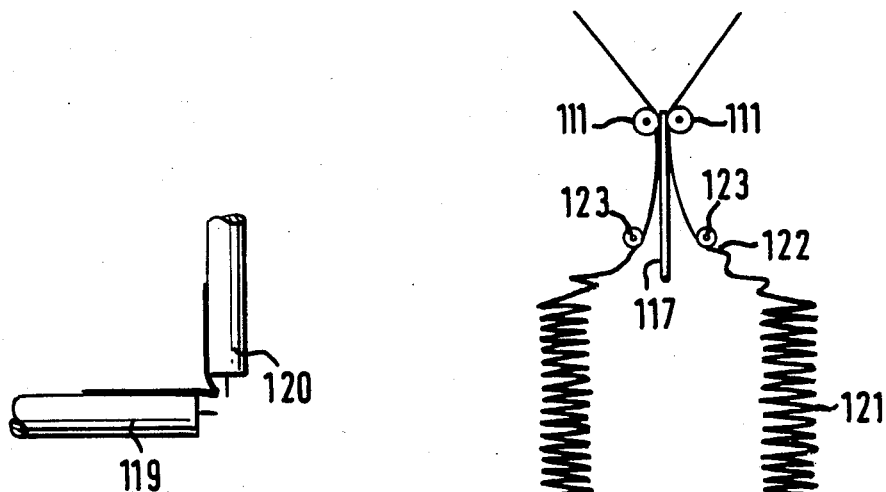
Figure 20B:
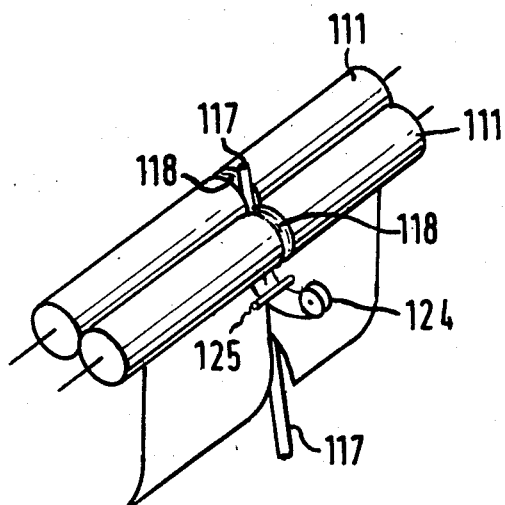

The sketches of FIGS. 20a and 20b show pinch rolls 111 and reactant feed pipe 117 as before. In FIG. 20a the shirred pack of plastics tubing 121 is shown, surrounding the feed pipe 117, with material being drawn from the pack at 122 through rolls 123 spreading it to the flat form required for entry to the pinch rolls. In FIG. 20b lay-flat tubing, slit by a knife (not shown), receives the feed pipe 117 and is then re-sealed by sticky tape from a reel 124 drawn past a guide 125. Otherwise the construction is as before. It will be noted that the tubing emerging from the pinch rolls is omitted in FIG. 20b for clarity.

In connection with these tubular web machines, it will be understood that a sealed feed zone is formed at the lower ends of the tubular webs, as indicated at 26 in FIG. 10, generally corresponding to the feed zone 11 of the embodiment of FIGS. 3-5.

In use, each machine shows the desirable features
(i) Introduction of liquid reactants.
(ii) Positive infeed control of film/webs as by the rollers/conveyors.
(iii) Positive upward control of foam block as by the pinned conveyors.
(iv) Positive control of expansion enclosure shape as by the rollers/static surfaces/conveyors and particularly the frictional/adhesion contact of such with the web ensuring that the shaping of the expansion enclosure is positive rather than simply by hydrostatic pressure.
(v) Arrival at required cross-section while foam is still fluid without damage to any developed adhesive structure.

Formulation and Operating Examples

The following are detailed examples of formulations and operating conditions.

EXAMPLE 1

The machine shown in FIG. 3 was used:
A. Dimensions
Paper = 100 g/m$^2$ kraft 1.78 meters wide
Film = 45 micron polyethylene film 1.10 meters wide
Feed channel and expansion enclosure volume, total to parallel section = 0.95 m$^3$
Feed channel volume = 0.03 m$^3$
Conveyor speed = 0.77 meters/minute
Conveyor length = 4 meters
Total chemical input = 37 kg/minute
Chemical input less reaction loss of 8% = 34 kg/minute
Finished foam density = kg/m$^3$
Area of cross-section of finished block = 1.70 m$^2$.

| B. Formulation (flexible polyether foam) | |
| --- | --- |
| | Parts by weight |
| Polyether polyol, 3500 molecular weight 48 hydroxyl no. | 100 |
| Water | 3.3 |
| Conventional silicone surfactant | 1.1 |
| Conventional amine catalyst - Dabco 33LV | 0.35 |
| Tin catalyst - Stannous octoate | 0.26 |
| Trichlorofluoromethane (Arcton 11) | 4.00 |
| Toluene diisocyanate (80:20 TDI) | 43.5 |

(Dabco and Arcton are trademarks)

C. General Conditions

Temperature of reaction mixture = 20° C.
Rise time for 100% expansion (box pour) = 110 seconds.
Chemicals mixed continuously in multi-component mix head with rotary mixer (3500) rpm). Air injected at rate of 1000 ml/minute for nucleation of foam.
Reaction mixture passed to the feed channel by two flexible plastics hoses 18 mm internal diameter.
Pressure of the reaction mixture monitored by pressure sensor mounted in the bottom-centre of the feed channel.

Observed pressure during continuous running=10-15 mm/Hg.

D. Examination of foam blocks

Block dimensions: 1.65×1.03×2.0 meters
Trim loss—all four skins removed=4% by weight
Block cross-section was rectangular
Trimmed piece density=26 kg/m³
Density variation—maximum density=26.8 kg/m³ minimum density=25.7 kg/m³
I.L.D. (indentation load deflection) hardness (203 mm diameter indentor, 460×460×75 mm sample) 50% compression
    Mean hardness=22.5 kg
    Maximum hardness=23.0 kg
    Minimum hardness=22.0 kg
Hot compression set=4.5%
Tensile strength=130 KPa
Elongation at break=230%

The above shows production of a foam of good properties in all respects.

EXAMPLE 2

The machine was set up generally in the same manner as in Example 1.

A. Formulation

| | Parts by weight |
|---|---|
| Polyether polyol, 3500 molecular weight 48 hydroxyl no. | 100 |
| Water | 4.3 |
| Silicone surfactant | 0.9 |
| Amine catalyst - Dabco 33LV: Niax* Al | 0.2–0.35 |
| Tin catalyst - stannous octoate | 0.28 |
| Trichlorofluoromethane - Arcton 11 | 1.5 |
| Toluene diisocyanate (80:20 TDI) | 53.6 |

*trademark

B. General Conditions

Conveyor speed=0.93 meters/minute
Total chemical input=38.3 kg/minute
Chemical input less reaction loss of 8.5%=35.0 kg/min. During the run the level of amine catalyst was varied between 0.2 and 0.35 parts per 100 parts of polyol. It was noted that at the higher level of catalyst (i.e. faster expansion reaction) the block thickness reduced ("thickness" is the dimension across the top of the diverging section). Decreasing the amine catalyst level returned the block thickness to normal.

C. Product

Foam blocks of finished density 22 kg/m³ and of good properties in all respects when tested as in Example 1 were given.

EXAMPLE 3

A high-resilience foam formulation based on an ethylene oxide "tipped" polyol of molecular weight 6000 and a proprietary isocyanate—Desmodur* MT58 from Bayer Chemicals Ltd. was run on the same machine as Examples 1 and 2.
    Foam density=36 kg/m³
    Chemical input rate (net)=35 kg/minute
    Conveyor speed=0.55 meters/minute
Again, good quality foam was produced.

Two examples of the use of the tubular web machines are outlined below:

EXAMPLE 4

In this example a 22 kilogram per cubic meter flexible polyether foam is made. The formulation is the following:

| | Parts by weight |
|---|---|
| Polyether polyol, 3500 molecular weight 48 hydroxyl no. | 100 |
| Water | 4.3 |
| Silicone surfactant | 0.9 |
| Amine catalyst - Dabco 33LV: Niax Al (trademark) ratio 3:1 by weight | 0.2–0.35 |
| Tin catalyst - stannous octoate | 0.28 |
| Trichlorofluoromethane - Arcton 11 | 1.5 |
| Toluene diisocyanate (80:20 TDA) | 53.6 |

The above is fed by conventional lines and mixing head and gives a block of the following properties:

| | |
|---|---|
| Diameter of finished block | 1.2 meters |
| Area of cross-section | 1.13 sq. meters |
| Volume of expansion enclosure | 0.85 cubic meters |
| Rise time of foam (elapsed time between entry of foam at nip and full expansion, at approximately the position where the cylindrical section 3 begins) | 110 seconds |
| Density of finished foam | 22 kilogrammes per cubic meter |
| Mean density of material in expansion enclosure | 44 kilogrammes per cubic meter |
| Mass of foam in expansion enclosure | 37.4 kilogrammes |
| Nett throughput of foam = $\frac{37.4}{110 \times 60}$ | = 20.4 kilogrammes per minute |
| Vertical velocity = $\frac{20.4}{22 \times 1.13}$ | = 0.82 meters per minute |

Foam of normal properties is produced and taken off the top of the machine by conventional saw and conveyors not shown.

EXAMPLE 5

Production of high resilience flexible polyurethane foam is rectangular block form (HR30).

A conventional HR polyurethane mix is used and successful foam produced, the calculations corresponding to Example 1 being as follows:

| | |
|---|---|
| Cross-section | 1.8 × 1 meter |
| Area of cross-section | 1.8 sq. meters |
| Volume of expansion zone | 1.0 cubic meters |
| Rise time | 110 seconds |
| Density of finished foam | 31 kilogrammes per cubic meter |
| Assumed mean density in expansion enclosure | 62 kilogrammes per cubic meter. |
| Mass of foam in expansion enclosure | 62 kilogrammes |
| Nett throughput = $\frac{62}{110 \times 60}$ | = 33.8 kilogrammes per minute |
| Vertical velocity = $\frac{33.8}{31 \times 1.8}$ | = 0.61 meters per minute. |

Density Profiles

Figure 6E:
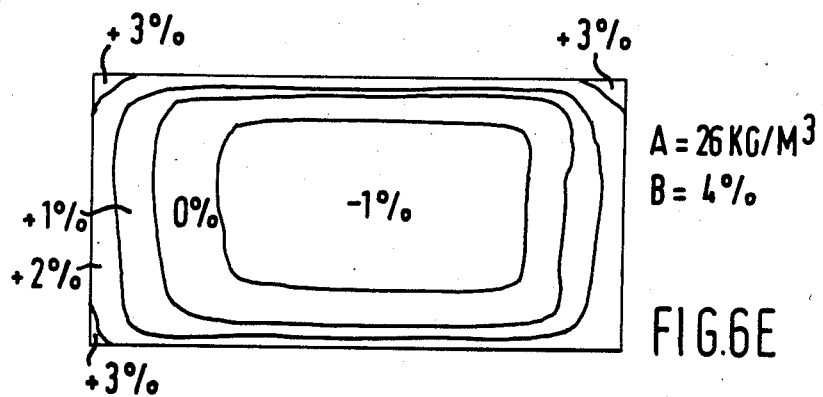
Figure 6A:
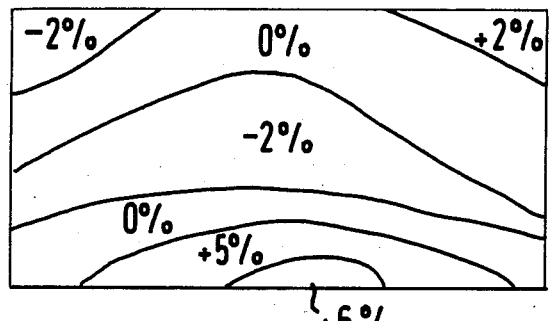
Figure 6B:
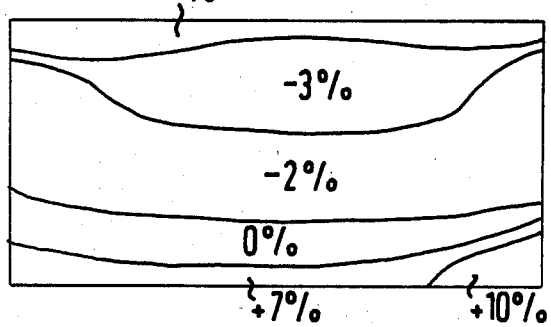
Figure 6C:
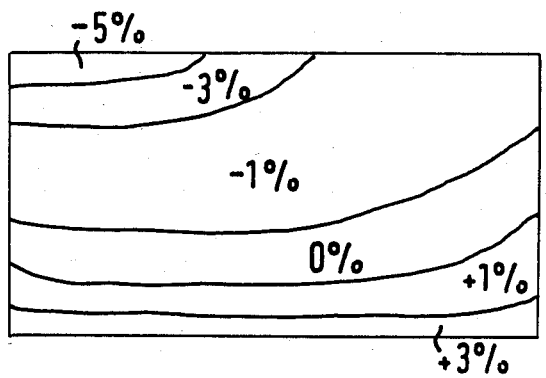
Figure 6D:
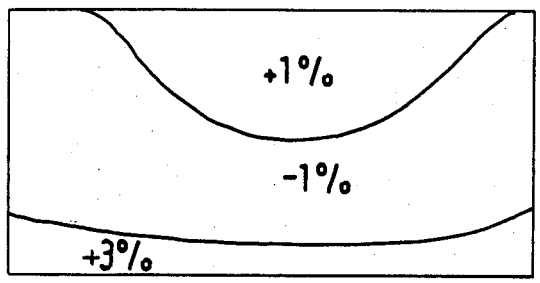

Generally, foam produced by the method of the invention shows properties comparable to conventionally produced foam. In respect of symmetry of property variation in the block however the foam produced is superior, as FIGS. 6A to 6E show. (The diagrams give percent variation about mean density, with mean density (A) and trim loss figures (B) alongside.) All diagrams are after skin trimming. The prior foams of FIGS. 6A to 6D all show a variation of properties broadly symmetrical about the vertical center line, though with some variations where conditions at the two sides have not been quite the same. Properties through the block from top to bottom however show considerable variation, undesirable in principle and noticeable in use when converted to large articles, such as mattresses, especially if cutting is vertically rather than horizontally of the block. In contrast the properties of blocks produced by the method of the invention are substantially symmetrical about the block center, as shown in FIG. 6E for the density of the foam blocks of Example 1.

Calculations

Figure 7:
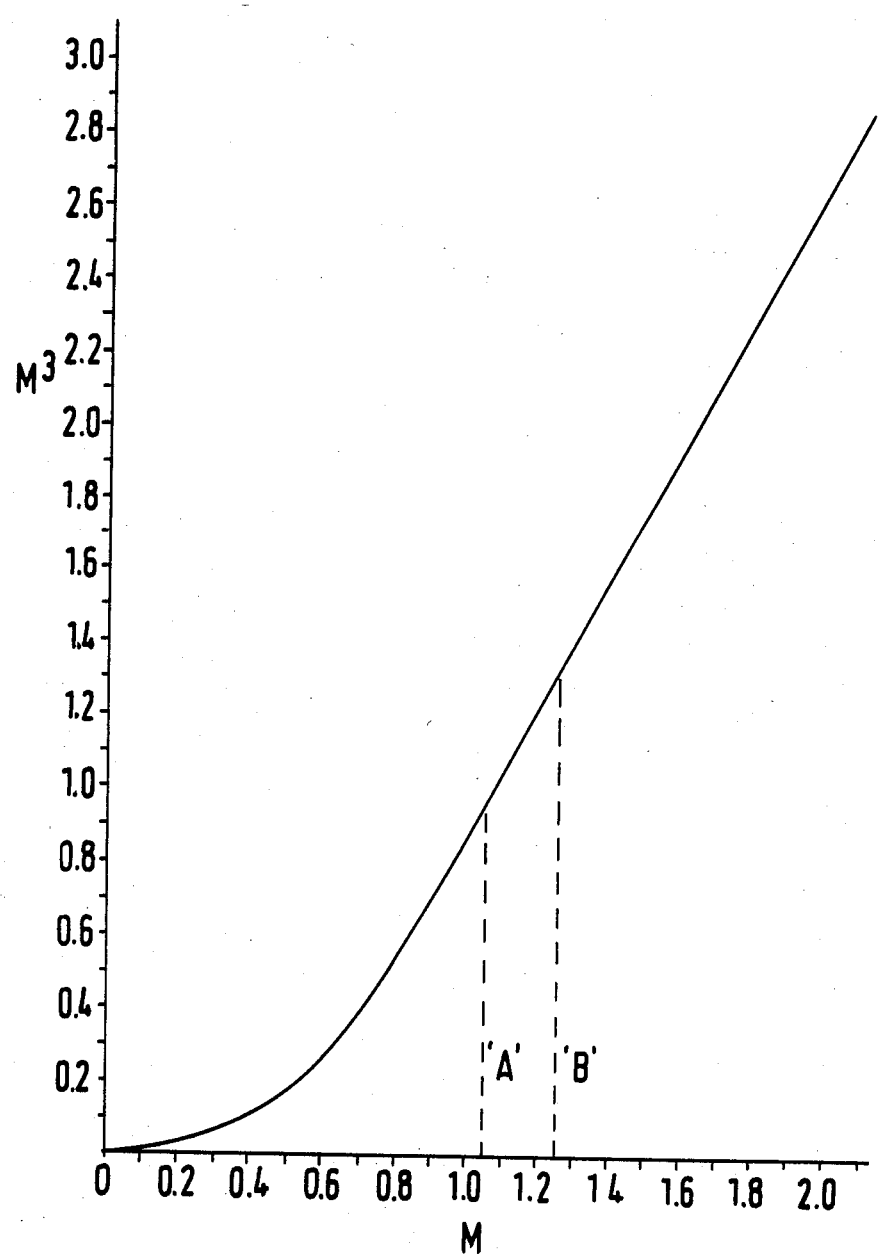
Figure 8:
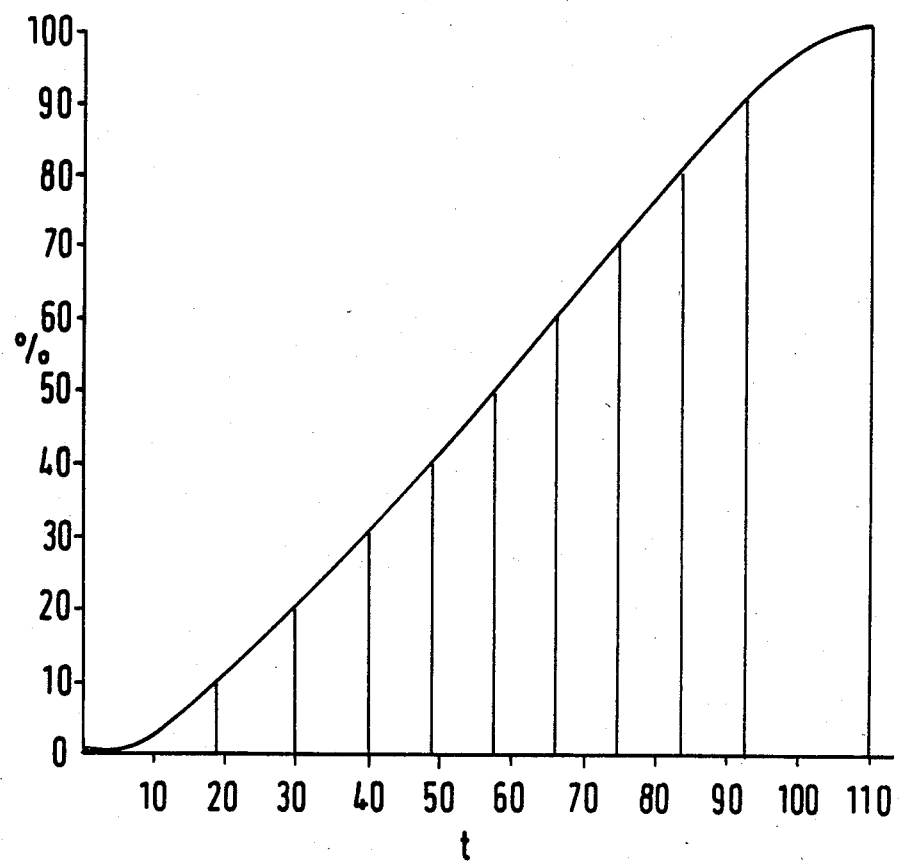

In considering the detail of control of the foaming, with reference in particular to Example 1, reference may be made to FIG. 7, showing the volume contained by the feed zone, expansion enclosure and take off path of the machine of FIG. 3 at various heights above the base of the feed channel, and FIG. 8 showing the foam expansion rise profile for a box pour of the formulation of Example 1. In FIG. 7 the cumulative volume is plotted vertically and the height above the base horizontally. Perpendicular A is dropped at the height of the start of the parallel take off path, perpendicular B at the height of the start of the pinned conveyor. In FIG. 8 the percentage expansion is plotted vertical and the rise time in seconds (t) horizontally. Perpendiculars are dropped corresponding to an expansion of 10%, 20% etc. to 100%.

These plots are used to calculate the foam volume at any interval, based on theory as follows.

Let $T_{100}$ be the time in seconds at which 100% expansion is reached, D be the final foam density in kg/m$^3$, and W be the net foam input (total reactant input less reactant loss) in kg/min, and consider a time interval $t_1$–$t_2$ seconds, then, ignoring volume of original unexpanded polymer:

$$\text{Area under curve between } t_1 \text{ and } t_2 = \sum_{t_1}^{t_2} E \times t \quad 1$$

$$\text{Now weight of foam dispensed in this time} = w = \sum_{t_1}^{t_2} \frac{W}{60} \times t \text{ kg} \quad 2$$

$$\text{Volume of foam represented by this weight} = V = \sum_{t_1}^{t_2} \frac{w \times E}{D \times 100} \quad 3$$

$$\text{Substituting 1 and 2 into 3} \quad \sum_{t_1}^{t_2} V = \frac{\text{Area under curve} \times W}{6000 \times D}$$

The procedure is thus:
1. Plot rise curve—% expansion v. time in seconds.
2. Divide into vertical columns A,B ... J corresponding to 10%, 20% ... 100%.
3. Measure area of each column under curve.
4. Calculate volume of foam corresponding to each column $$A, B \ldots J \text{ using formula } V = \frac{\text{Area under curve} \times W}{6000 \times D}$$

5. From known reaction volume (volume of feed zone and expansion enclosure) relate to expansion height The actual calculations for Example 1 are:

A—Volume of partially expanded foam corresponding to time period of 110 seconds (100% rise time)

TABLE I

| Max. % expansion | Time (seconds) | Area under rise curve | Calculated foam volume (m$^3$) | Cumulative volume (m$^3$) | Foam height (m$^3$) |
|---|---|---|---|---|---|
| 10 | 19 | 60 | 0.013 | 0.013 | 0.1 |
| 20 | 30 | 165 | 0.036 | 0.049 | 0.25 |
| 30 | 40 | 250 | 0.054 | 0.103 | 0.40 |
| 40 | 49 | 315 | 0.069 | 0.172 | 0.50 |
| 50 | 57 | 360 | 0.078 | 0.250 | 0.60 |
| 60 | 66 | 495 | 0.108 | 0.358 | 0.69 |
| 70 | 75 | 585 | 0.127 | 0.485 | 0.76 |
| 80 | 84 | 675 | 0.147 | 0.632 | 0.86 |
| 90 | 93 | 765 | 0.167 | 0.799 | 0.96 |
| 100 | 110 | 1615 | 0.352 | 1.151 | 1.15 |

Reaction volume up to parallel section = 0.95 m$^3$
Height up to parallel section = 1.05 m i.e. foam reached 100% expansion at a point 0.1 m above start of parallel section.

B—Calculation of conveyor velocity:

Net chemical input rate must match foam output rate on weight basis.

If: final foam density = $D$ kg/m$^3$
net chemical input = $W$ kg/minute
area of cross section of foam = $A$ m$^2$ $$\text{Then: conveyor velocity} = \frac{W}{D \times A}$$

$$= \frac{34}{26 \times 1.7} = 0.77 \text{ meters/minute.}$$

C—Theory of expansion control

Assume that velocity of conveyor is set for correct final density and throughput rate.

Consider each of three cases:

1. $T_{100}$ just right

All expansion occurs by end of diverging section. Cell orientation maximised in horizontal direction. Density correct.

2. $T_{100}$ too low

Foam will not make up to full width, the end of the diverging section not having been reached. Density will be higher. Higher pressure in expansion enclosure.

3. $T_{100}$ too high

Foam makes up to full width. Some expansion occurs in parallel section. Cell orientation more isotropic. Pin grip reduced since foam now takes longer to develop strength.

In practice it is arranged for the $T_{100}$ time to be marginally higher than theoretically required so as to ensure complete filling out.

SUMMARY OF ADVANTAGES

The advantages of the production of foam as described and discussed above are we believe clear. In summary they are:

- reduction of capital cost and space requirement for machines;
- convenient production rate with smaller, continuously occupied labour force and less attendance required on machine in any case;
- reduction of storage and curing space required for product prior to further handling;
- lower rate and absolute amount of fume emission, giving ready and inexpensive compliance with statutory requirements;
- reduced start up and shut down waste, and similarly in grade and colour changes, owing to the lower rate of operation;
- no leathery top skin except at start up and thinner skins generally;
- symmetrical distribution of physical properties in the block;
- accurately controlled cross section.

All these matters add up to a major advance in foam production, allowing foam to be widely and economically made in moderate sized units serving individual markets where neither capital for major installations nor transport for their products over large areas are available.

I claim:

1. A method of continuous production of foamed material, wherein foam forming materials are fed from below at a controlled rate and the foamed material formed is drawn away from above at a corresponding rate; wherein foaming takes place in a diverging expansion enclosure bounded by moving sheet material constrained to follow a diverging path and drawn away from above so as to travel with the foaming material at a rate corresponding to its rate of travel; wherein the enclosure is defined above by foam already expanded, at the sides by said sheet material, and below by a feed zone sealed to contain the foam forming materials, the enclosure leading into an upwardly directed take off path for the foam; and wherein the expansion closure is formed by flexible sheet material in tubular form which is fed flat with foam forming materials passing to the interior of the tube and then drawn away at a rate method to the rate of feed, guided externally to assume a predetermined cross section as the foam forming materials expand within it, and constituting both said feed zone and said expansion enclosure.

2. A method according to claim 1 wherein the tubular sheet material is of plastic material comprising a lay-flat tube slit for entry of a feed for the foam-forming materials and re-sealed thereafter.

3. A method according to claim 1 wherein the tubular sheet material is fed through pinch rollers or apposed conveyors at the lowest point of the feed zone and expansion enclosure.

4. A method according to claim 3 wherein said rollers or conveyors have a resilient surface grooved to allow passage of one or more feeds for the foam forming materials.

5. A method according to claim 1 wherein guides assist the tubular sheet material to bell out from the apposed state, as fed, to from the expansion enclosure, said guides being powered rollers or belts passing the web with a friction drive thereof.

6. A method according to claim 1 wherein spiked conveyors are provided at one or more positions at the sides of the take off path, engaging the foamed material.

7. A method according to claim 1 wherein a pressure monitor is provided in the feed zone or in the expansion enclosure in contact with still-liquid foaming materials.

8. A method according to claim 1 wherein the sheet material is a plastic film passing up the take off path to be perforated by a spiked conveyor for the foam.

9. A method according to claim 1 wherein the expansion enclosure and take off path are circular in cross section for the production of cylindrical blocks for peeling.

10. A method according to claim 1 wherein heated surfaces are applied at the surface of the foam body once fully expanded, to prevent loss of heat from the body and thus secure a uniform curing rate throughout the body.

11. A method according to claim 10 wherein said heating is applied by low output film heaters backed by insulation.

12. A method according to claim 1, wherein the tubular sheet material is of plastic material as a shirred pack.

13. A method according to claim 1, wherein the tubular sheet material is of plastic material as two apposed flat webs sealed together at the edges.

14. A method of continuous upward production of foamed material, in which foam forming liquid reactant materials are mixed and fed at a controlled rate to a sealed feed zone leading into an upwardly diverging expansion enclosure wherein foaming takes place and thence into an upwardly extending take-off path for expanded foam, the feed zone being continuous with the expansion enclosure, in which the expansion enclosure is defined above by already expanded foam in the take-off path and at the sides by travelling sheet material drawn upward from above the expansion enclosure so that the surface of the body of expanding foam and the travelling sheet material move together; it being assured that expansion is not completed before the end of the diverging portion of the expansion enclosure is reached; and the travelling sheet material being constituted by a tubular web fed in collapsed form and expanded by the foaming materials.

15. A method according to claim 14, in which controllably drive conveyor means are provided at one or more positions at the sides of the take-off path positively gripping the foamed material above said diverging expansion enclosure sufficiently to draw it upwards at a controlled rate related to the reactant feed rate and the foaming conditions.

16. A method according to claim 15 wherein at least part of the sheet material and therewith the expanded foam is positively drawn upward by said conveyor means, said conveyor means being provided with spikes which penetrate the sheet material at one or more positions at the sides of the take-off path.

17. A method according to claim 14 wherein a pressure monitor is provided in contact with still-liquid foaming material in the feed zone or expansion enclosure to facilitate control of feed or take-off accordingly.

18. A machine for continuous production of foamed material, comprising feed means for feeding foam forming materials from below at a controlled rate, take off means for drawing the foamed material formed away from above at a corresponding rate, means forming a diverging expansion enclosure bounded by moving sheet material constrained to follow a diverging path and drawn away from above so as to travel with the foaming material at a rate corresponding to its rate of travel, in which diverging expansion enclosure foaming takes place, said enclosure being defined above by foam already expanded, at the sides by said sheet material, and below by a feed zone sealed to contain the foam forming materials, the enclosure leading into an upwardly directed take off path for the foam, wherein the expansion enclosure is formed by flexible sheet material in tubular form which is fed flat with foam forming materials passing to the interior of the tube and then drawn away at a rate matched to the rate of feed, guided externally to assume a predetermined open cross section as the foam forming materials expand within it, and constituting both said feed zone and said expansion enclosure.

19. A machine according to claim 18 wherein the tubular sheet material is of plastic material, and is a lay-flat tube slit for entry of a feed for the foam-forming materials and re-sealed thereafter.

20. A machine according to claim 18 wherein the tubular sheet material is fed through pinch rollers or apposed conveyors at the lowest point of the feed zone and expansion enclosure.

21. A machine according to claim 20 wherein said rollers or conveyor have a resilient surface grooved to allow passage of one or more feeds for the foam forming materials.

22. A machine according to claim 18 wherein guides assist the tubular sheet material to bell out from the apposed state, as fed, to form the expansion enclosure, said guides being powered rollers or belts passing the tubular sheet material with a friction drive thereof.

23. A machine according to claim 18 wherein spiked conveyors are provided at one or more positions at the sides of the take off path, to engage the foamed material.

24. A machine according to claim 18 wherein a pressure monitor is provided in or above the feed zone at a position to contact still-liquid foaming materials.

25. A machine according to claim 18 wherein the sheet material is a plastic film passing up the take off path to be perforated by a spiked conveyor for the foam.

26. A machine according to claim 18 wherein the expansion enclosure and take off path are circular in cross section for the production of cylindrical foamed bodies for peeling.

27. A machine according to claim 18 wherein the tubular sheet material is of plastic material as a shirred pack.

28. A machine according to claim 18 wherein the tubular sheet material is of plastic material as two apposed webs sealed together at the edges.

29. A machine for continuous upward production of foamed material by a method in which foam forming liquid reactant materials are fed at a controlled rate to a sealed feed zone leading into an upwardly diverging expansion enclosure wherein foaming takes place and thence into an upwardly extending take-off path for expanded foam, comprising means forming a sealed feed zone leading into an upwardly diverging expansion enclosure wherein foaming takes place and thence into an upwardly extending take-off path for expanded foam, the feed zone being continuous with the expansion enclosure, means for controllably feeding foam forming liquid reactant materials to said sealed feed zone, travelable flexible sheet material defining the sides of at least the expansion enclosure, means for drawing the sheet material upward from above the expansion enclosure such that in operation the expansion enclosure is defined above by already expanded foam in the take-off path and at the sides by travelling sheet material so that the surface of the body of expanding foam and the travelling sheet material move together, the machine being controllably operable to ensure that expansion is not completed before the end of the diverging portion of the expansion enclosure is reached; and the travelling sheet material being constituted by a tubular web fed in collapsed form and expanded by the foaming materials.

30. A machine according to claim 29 wherein controllably driven conveyor means are provided at one or more positions at the sides of the take-off path for positively gripping the foamed material above said diverging expansion enclosure sufficiently to draw it upwards at a controlled rate related to the reactant feed rate and the foaming conditions.

31. A machine according to claim 29 wherein said expansion enclosure has supporting walls, and the sheet material is drawn over supporting walls of the expansion enclosure.

32. A machine according to claim 29 wherein the sheet material and therewith the expanded foam is positively drawn upward by said conveyor means, said conveyor means being provided with spikes which penetrate the sheet material at one or more positions at the sides of the take-off path.

33. A machine according to claim 29 wherein a pressure monitor is provided in contact with still-liquid foaming material in the feed zone or expansion enclosure to facilitate control of feed or take-off accordingly.

34. A machine according to claim 29 wherein the expanded foam is positively drawn upward by said conveyor means, said conveyor means having spikes which penetrate the expanded foam at one or more positions at the sides of the take-off path.

* * * * *

UNITED STATES PATENT AND TRADEMARK OFFICE
CERTIFICATE OF CORRECTION

PATENT NO. : 4,567,008
DATED : January 28, 1986
INVENTOR(S) : Anthony C. M. Griffiths It is certified that error appears in the above-identified patent and that said Letters Patent is hereby corrected as shown below:

Column 19, line 51, "method" should read -- matched --.

Column 20, line 1, "from" should read -- form --.

Signed and Sealed this

Seventeenth Day of February, 1987

Attest:

DONALD J. QUIGG

Attesting Officer       Commissioner of Patents and Trademarks